United States Patent
Ee et al.

(10) Patent No.: US 12,380,921 B2
(45) Date of Patent: Aug. 5, 2025

(54) SUSPENSION ASSEMBLY WITH DIMPLE FEATURES FOR ENGAGEMENT WITH ACTUATOR ARM

(71) Applicant: Magnecomp Corporation, Murrieta, CA (US)

(72) Inventors: Kuen Chee Ee, Chino, CA (US); David Glaess, Bangkok (TH); Harlan Kragt, Bangkok (TH)

(73) Assignee: Magnecomp Corporation, Murrieta, CA (US)

(*) Notice: Subject to any disclaimer, the term of this patent is extended or adjusted under 35 U.S.C. 154(b) by 0 days.

(21) Appl. No.: 18/195,225

(22) Filed: May 9, 2023

(65) Prior Publication Data
US 2023/0368813 A1    Nov. 16, 2023

Related U.S. Application Data

(60) Provisional application No. 63/341,184, filed on May 12, 2022.

(51) Int. Cl.
*G11B 5/48* (2006.01)

(52) U.S. Cl.
CPC .......... *G11B 5/4833* (2013.01); *G11B 5/4813* (2013.01)

(58) Field of Classification Search
None
See application file for complete search history.

(56) References Cited

U.S. PATENT DOCUMENTS

| | | | |
|---|---|---|---|
| 6,215,624 B1 * | 4/2001 | Summers et al. | ... G11B 5/4833 360/244.5 |
| 6,297,934 B1 * | 10/2001 | Coon | ..... G11B 21/21 360/244.6 |
| 6,956,720 B2 | 10/2005 | Takagi et al. | |
| 7,542,240 B1 | 6/2009 | Bjorstrom et al. | |
| 7,609,481 B1 | 10/2009 | Padeski et al. | |
| 7,633,717 B1 | 12/2009 | Fossum et al. | |
| 7,907,367 B1 | 3/2011 | Chocholaty et al. | |
| 7,924,530 B1 | 4/2011 | Chocholaty | |
| 8,094,415 B2 | 1/2012 | Yokota et al. | |
| 8,233,238 B2 | 7/2012 | Yabu et al. | |
| 9,070,391 B1 | 6/2015 | Berscheit | |
| 10,002,629 B2 | 6/2018 | Bennin et al. | |
| 12,020,732 B2 | 6/2024 | Phu et al. | |

(Continued)

OTHER PUBLICATIONS

International Search Report and Written Opinion in International Application No. PCT/US2023/021704, mailed Aug. 4, 2023.

*Primary Examiner* — Craig A. Renner
(74) *Attorney, Agent, or Firm* — DLA Piper LLP (US)

(57) ABSTRACT

A suspension assembly includes a baseplate having an upper surface and a lower surface opposite the upper surface, a load beam mounted to the baseplate, a cylindrical hub extending from the upper surface, wherein the cylindrical hub comprises an inner surface that defines a swage hole extending through the baseplate, and a plurality of dimples protruding from the upper surface of the baseplate, wherein each of the dimples includes a rounded side protruding from the upper surface of the baseplate and terminating in an apex. The apexes of the dimples define a contact plane for engaging with the lower surface of the actuator arm swaged to the cylindrical hub.

2 Claims, 7 Drawing Sheets

(56) References Cited

U.S. PATENT DOCUMENTS

| | | | |
|---|---|---|---|
| 2006/0193085 A1* | 8/2006 | Budde et al. | G11B 5/5552 360/245.3 |
| 2007/0086114 A1 | 4/2007 | Van Sloun et al. | |
| 2016/0019918 A1 | 1/2016 | Juman | |
| 2021/0287699 A1 | 9/2021 | Ee et al. | |

* cited by examiner

SUSPENSION ASSEMBLY WITH DIMPLE FEATURES FOR ENGAGEMENT WITH ACTUATOR ARM

CROSS-REFERENCE TO RELATED APPLICATIONS

This application claims the benefit of, and priority to, U.S. Provisional Application No. 63/341,184 filed on May 12, 2022, which is hereby incorporated by reference in its entirety.

FIELD OF THE INVENTION

The present disclosure relates generally to suspension assemblies for supporting read/write heads adjacent rotating disks in disk drives, and more particularly to a baseplate with features for engaging the actuator arm.

BACKGROUND OF THE INVENTION

Increasing storage capacity is a goal in the data storage industry. Data storage products such as magnetic disk drives and optical disk drives store digital information on rotating disks using read/write heads mounted on suspension assemblies. The information is typically recorded in concentric, circumferential tracks about the near-center of the disk.

The hubs of suspension assemblies are inserted into an actuator arm boss hole extending from an actuator body. Typically, a swage ball is passed through the cylindrical hubs to force the peripheries of the hubs to expand (swage) into tight engagement with the inner peripheries of the actuator arm boss hole. Thus, an actuator arm may carry multiple suspension assemblies on opposite sides of the rotating disk to support read/write heads in opposing directions, one up and one down.

Figure 1:
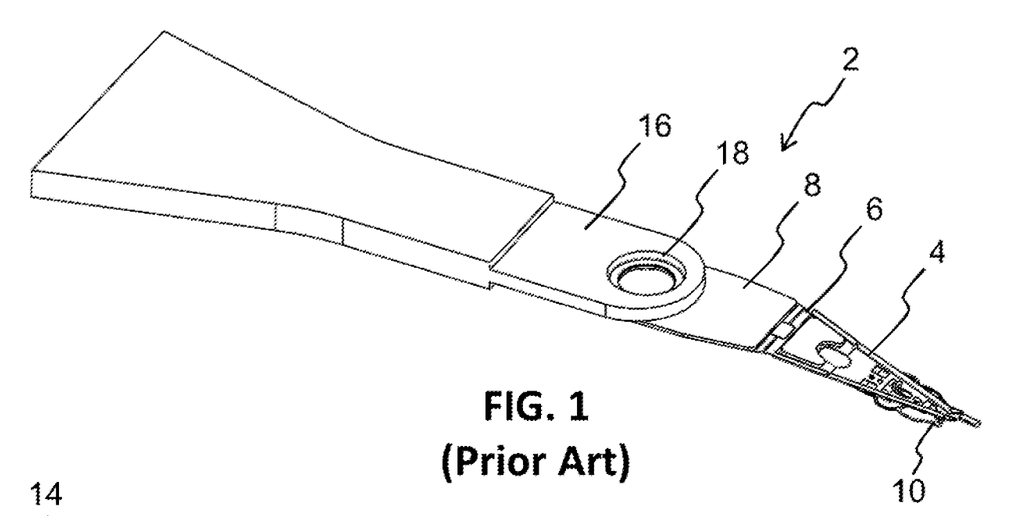
FIG. 1 is a perspective view of a conventional suspension assembly.
Figure 2:
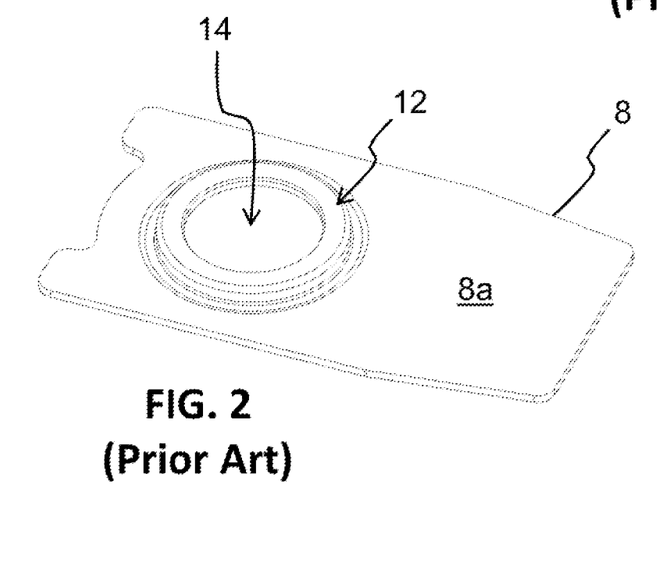
FIG. 2 is a perspective view of a conventional baseplate.

FIGS. 1-2 illustrate a conventional suspension assembly 2, which includes a load beam 4 terminating at a proximal end with a hinge 6 that is connected to a baseplate 8. A slider 10 (containing the read/write head) is mounted to the distal end of the load beam 4. The baseplate 10 includes a cylindrical hub 12 defining a swage hole 14. The cylindrical hub 12 extends from a planar upper surface 8*a* of the baseplate 8. The cylindrical hub 12 is configured to fit into an opening 18 in an actuator arm 16, where the cylindrical hub 12 can be swaged into the actuator arm opening 18 to secure the baseplate 8 to the actuator arm 16. Swaging is performed by, for example, driving a ball through the swage hole 14 of cylindrical hub 12, which has an outer diameter larger than an inner diameter of the cylindrical hub 12. As a result, the ball tends to exert a deforming load on the cylindrical hub 12, where the cylindrical hub 12 deforms to press against the walls of the opening 18 in the actuator arm 16 as the ball passes through the swage hole 14.

The interface between the baseplate 8 and the actuator arm 16 should be such that there is no relative movement between these two components. The quality of this interface is dictated by the quality of swage between the cylindrical hub 12 and the opening 18 of the actuator arm 16. Other factors can affect the quality of this interface. For example, the flatness of the upper surface 8*a* of the baseplate 8 is important (i.e. to ensure a consistent contact surface with the lower surface of the actuator arm 16. As suspension assemblies 2 become thinner to accommodate higher density drives, it can be more challenging to ensure the flatness of the baseplate upper surface. For example, the baseplate 8 can deflect such that it's upper surface 8*a* is not perfectly flat, and therefore does not offer a good planar surface to engage with the planar lower surface of the actuator arm. Asymmetric baseplate designs have also been developed, further making it challenging to provide a consistent and flat baseplate upper surface for consistent contact with the actuator arm lower surface after the swaging process.

As the need for increased data storage capacity in hard disk drives has grown and the size of the disk drive has decreased to fit in smaller electronics, forming a strong and reliable connection between the actuator arms and the suspension assemblies has been made more difficult as the relative components have become smaller.

BRIEF SUMMARY OF THE INVENTION

The aforementioned problems and needs are addressed by a suspension assembly, that includes a baseplate having an upper surface and a lower surface opposite the upper surface, a load beam mounted to the baseplate, a cylindrical hub extending from the upper surface, wherein the cylindrical hub comprises an inner surface that defines a swage hole extending through the baseplate, and a plurality of dimples protruding from the upper surface of the baseplate, wherein each of the dimples includes a rounded side protruding from the upper surface of the baseplate and terminating in an apex.

A suspension assembly is provided that includes a baseplate having an upper surface and a lower surface opposite the upper surface, a load beam mounted to the baseplate and extending along the lower surface of the baseplate, wherein the load beam includes a ridge feature that extends above the upper surface of the baseplate, a cylindrical hub extending from the upper surface, wherein the cylindrical hub comprises an inner surface that defines a swage hole extending through the baseplate, and a dimple protruding from the upper surface of the baseplate and including a rounded side protruding from the upper surface of the baseplate and terminating in an apex, wherein the cylindrical hub is disposed between the dimple and the ridge feature.

A suspension assembly is provided that includes a baseplate having an upper surface and a lower surface opposite the upper surface, a load beam mounted to the baseplate and extending along the lower surface of the baseplate, wherein the load beam includes first and second U-shape features that wrap around an edge of the baseplate and include portions that extend along the upper surface of the baseplate, a cylindrical hub extending from the upper surface, wherein the cylindrical hub comprises an inner surface that defines a swage hole extending through the baseplate, and a dimple protruding from the upper surface of the baseplate and including a rounded side protruding from the upper surface of the baseplate and terminating in an apex, wherein the cylindrical hub is disposed between the dimple and the U-shape features.

In some examples, a suspension assembly includes a baseplate having an upper surface and a lower surface opposite the upper surface, a load beam having an upper surface and lower surface opposite the upper surface of the load beam, wherein the upper surface of the load beam is mounted to the lower surface of the baseplate, a cylindrical hub extending from the upper surface, wherein the cylindrical hub comprises an inner surface that defines a swage hole extending through the baseplate, and a plurality of dimples protruding from the upper surface of the load beam, wherein each of the dimples includes a rounded side protruding from the upper surface of the load beam and terminating in an apex, wherein the dimples extend beyond the upper surface of the baseplate.

In some examples, a suspension assembly includes a baseplate having an upper surface and a lower surface opposite the upper surface, a load beam mounted to the baseplate, a cylindrical hub extending from the upper surface, wherein the cylindrical hub comprises an inner surface that defines a swage hole extending through the baseplate, a plurality of dimples protruding from the upper surface of the baseplate, wherein each of the dimples includes a rounded side protruding from the upper surface of the baseplate and terminating in an apex, and an actuator arm having an opening and a plurality of through-holes, wherein the cylindrical hub extends into the opening such that an outer surface of the cylindrical hub is engaged with an inner surface of the opening, and wherein the apexes of the plurality of dimples are disposed in the through-holes.

Other objects and features of the present disclosure will become apparent by a review of the specification, claims and appended figures.

DETAILED DESCRIPTION OF THE INVENTION

Figure 3:
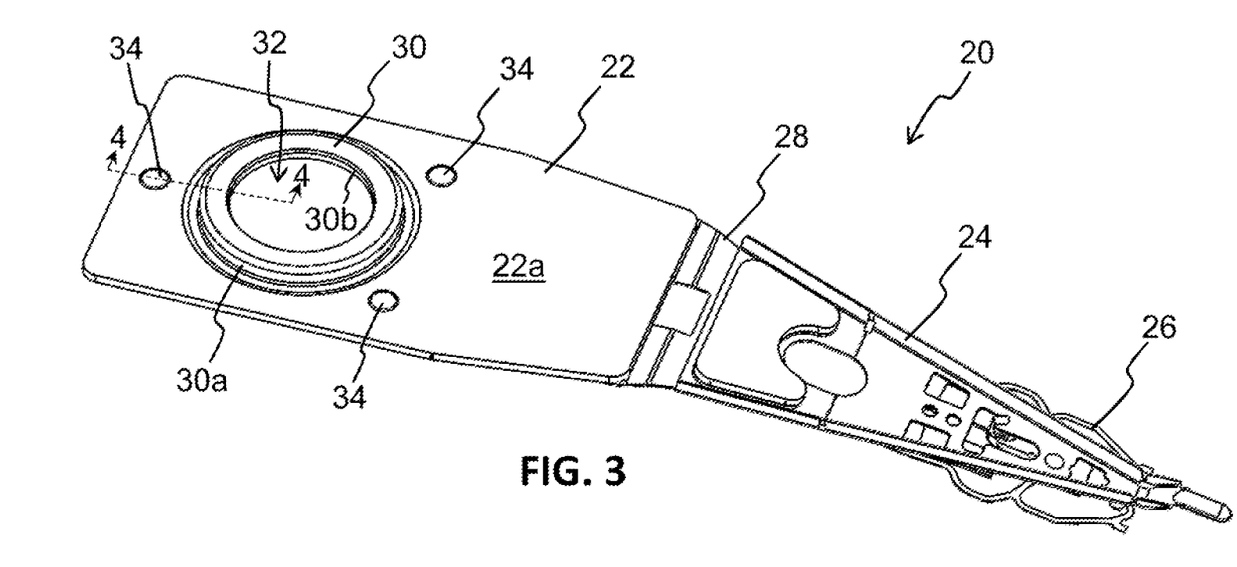
FIG. 3 is a perspective view of a suspension assembly according to an example of the present disclosure.
Figure 4:
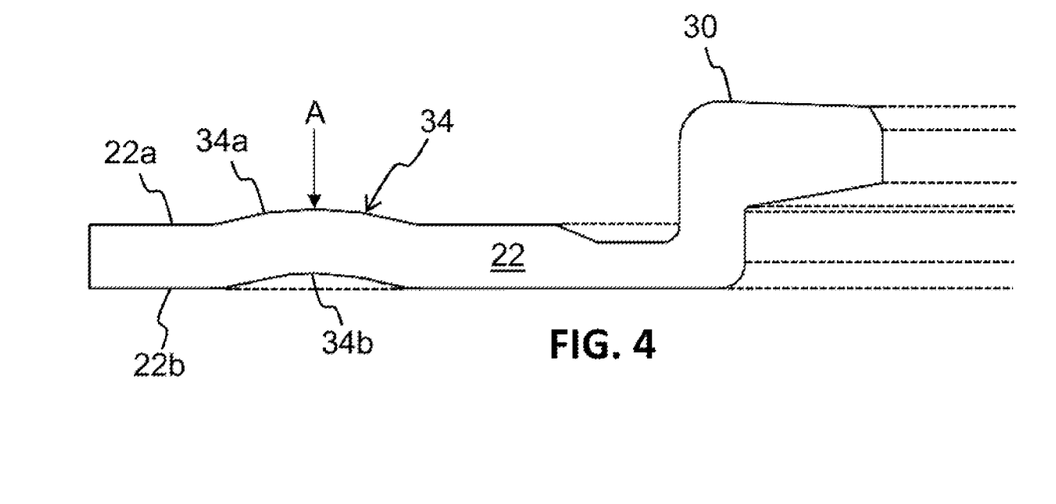
FIG. 4 is a side cross-sectional view of the baseplate according to an example of the present disclosure.
Figure 5:
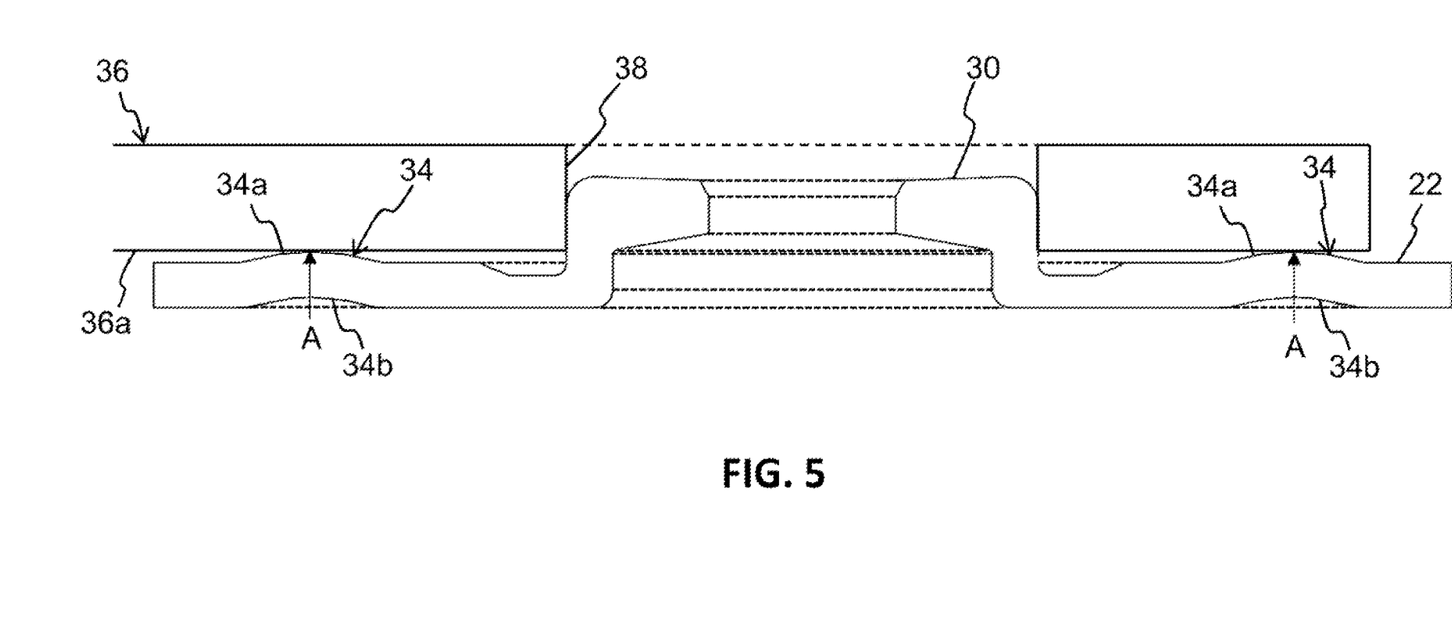
FIG. 5 is a side cross-sectional view of the baseplate and the actuator arm according to an example of the present disclosure.

The present disclosure is directed to examples of a baseplate of a suspension assembly for engagement with an actuator arm. As shown in FIGS. 3-5, a suspension assembly 20 include a baseplate 22, load beam 24 and slider 26. The load beam 24 terminates at a proximal end with a hinge 28 that is connected to the baseplate 22. The slider 26, which contains the read/write head, is mounted to the distal end of the load beam 26. The baseplate 22 includes an upper surface 22a and a lower surface 22b that oppose each other, and a cylindrical hub 30 that extends up from the upper surface 22a of the baseplate 22. The cylindrical hub includes an outer surface 30a, and an inner surface 30b that defines a swage hole 32 extending through the baseplate 22.

As best shown in FIGS. 3-4, the baseplate 22 includes three dimples 34 arranged around the cylindrical hub 12. Dimples 34 are punch through type, meaning that they are formed using a punch process affecting both the upper surface 22a and the lower surface 22b of baseplate 22. Dimples 34 can be formed by punching a dimple punch into the lower surface 22b of baseplate 22, deforming the baseplate 22 to result in dimple 34. Each dimple 34 includes a protruding side 34a (rounded side) having a rounded convex shape protruding from the upper surface 22a of baseplate 22 and terminating at an apex A (i.e., a single point of maximum protrusion of the rounded protruding side 34a relative to the upper surface 22a), and a recessed side 34b (rounded side) having a rounded concave shape recessed into the lower surface 22b of baseplate 22. Therefore, the upper surface 22a of the baseplate 22 is generally planar except for cylindrical hub 30 and the protruding sides 34a of dimples 34.

The apexes A of the rounded protruding sides 34a of the three dimples 34 provide three points that define a contact plane above the upper surface 22a of baseplate 22 for engaging with the actuator arm swaged to the baseplate 22. As best shown in FIG. 5, to swage the baseplate 22 to the actuator arm 36, the cylindrical hub 30 of baseplate 22 is inserted into the opening 38 of the actuator arm 36 until the bottom surface 36a of the actuator arm 36 makes contact with the apexes A of the three dimples 34. The swaging process is then performed to secure the baseplate 22 to the actuator arm 36 in the position shown in FIG. 5. The three dimples 34 provide a reliable contact plane for the lower surface 36a of the actuator arm 36, with rounded surfaces that reduce the portions of upper surface 22a in contact with the actuator arm (surface contact limited to the apexes A of the rounded protruding sides 34a of the three dimples 34). Therefore, even if the baseplate upper surface 22a is not sufficiently planar, or becomes deformed from a planar shape, the dimples 34 will still provide three point contacts defining a contact plane for reliably making contact with the lower surface 36a of the actuator arm 36, thereby making the swaging process and the swaged interconnection between the baseplate 22 and the actuator arm 36 more reliable. The dimples 34 provide a consistent and reliable contact between the upper surface 22a of the baseplate 22 and the lower surface 36a of the contact arm 36, even if the baseplate 22 is not planar and even if the dimples 34 are not the same height. Dimple formation is robust and repeatable, and the dimple height can be tailored for the particular baseplate thickness and material. In order to minimize the area of contact between each dimple and the actuator arm lower surface, each dimple 34 preferably has a symmetrical, circular shape, providing an apex A of small size. It should be noted that while three dimples 34 can be ideal for many applications, the numbers of dimples 34 can be greater or fewer than three and still provide a superior contact between the baseplate 22 and actuator arm 36 for the swaging processing and the resulting swage connection.

Figure 6:
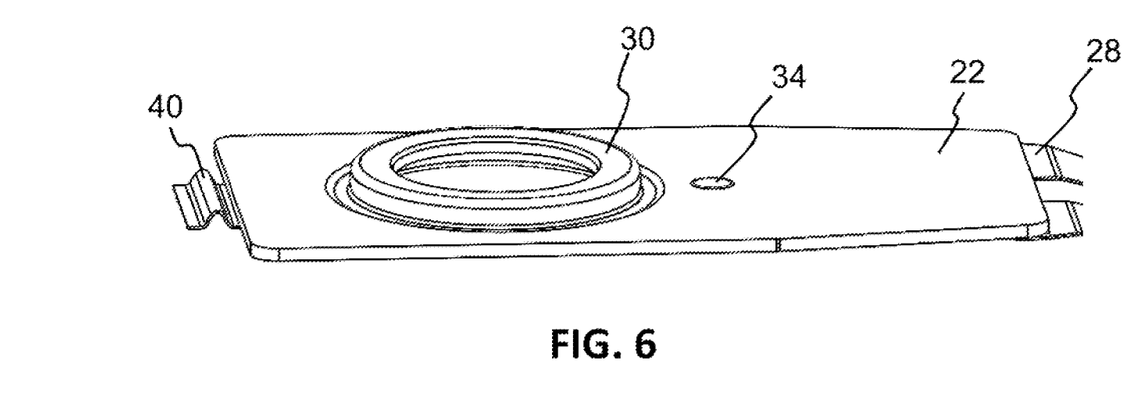
FIG. 6 is a perspective view of the baseplate and the load beam according to an example of the present disclosure.
Figure 7:
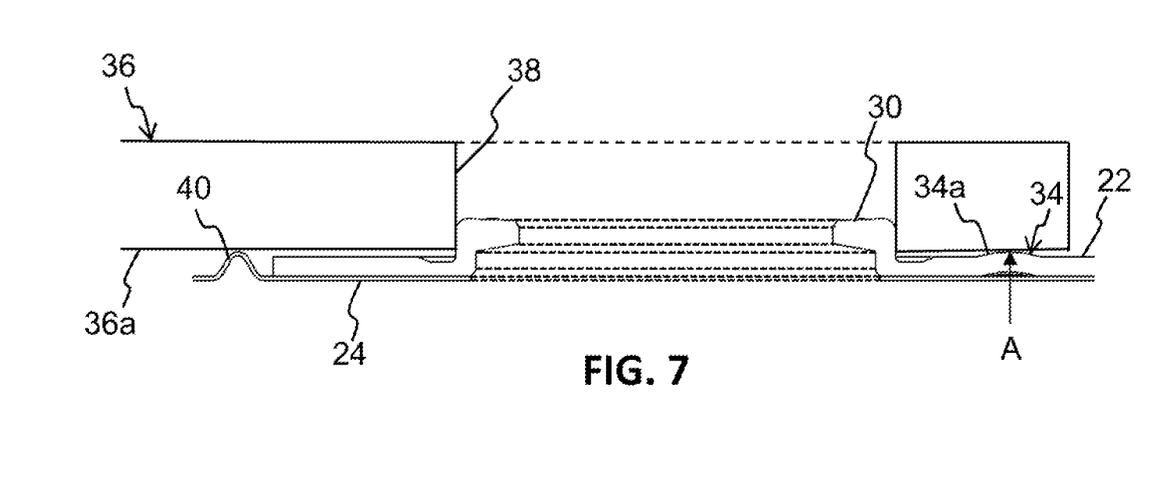
FIG. 7 is a side cross-sectional view of the baseplate, the load beam and the actuator arm according to an example of the present disclosure.

FIGS. 6-7 illustrate an alternate example, where the load beam 24 extends beyond the hinge 28 and under baseplate 22, and terminates in a ridge feature 40 that extends up beyond the far edge of the baseplate 22. The peak of the ridge feature 40 is above the upper surface 22a of the baseplate 22, so that the ridge feature 40 and a dimple 34 (positioned on the other side of the cylindrical hub 30) provide a contact plane for the lower surface 36a of the actuator arm 36. Having the ridge feature 40 on the load beam 24, which can be thinner than the baseplate 22, allows for an extra processing step to fine tune the height of the ridge feature 40 as needed to further reduce the tolerance. Mechanical or laser adjustment processes can be used for fine tuning.

Figure 8:
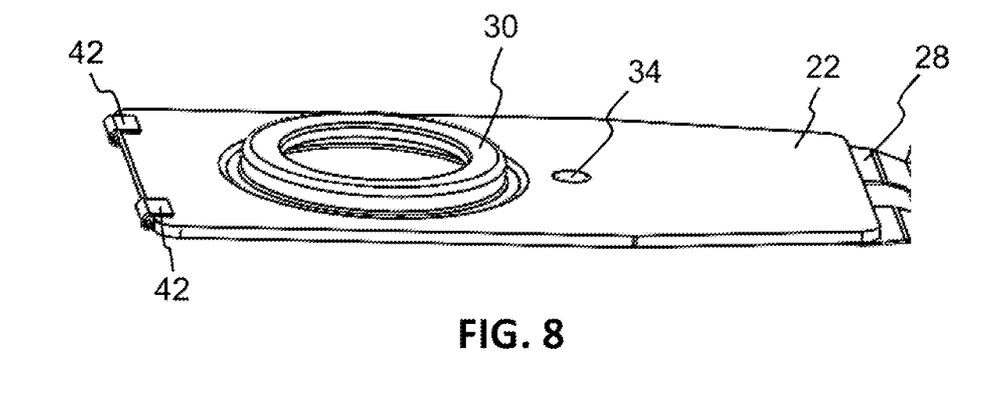
FIG. 8 is a perspective view of the baseplate and the load beam according to an example of the present disclosure.
Figure 9:
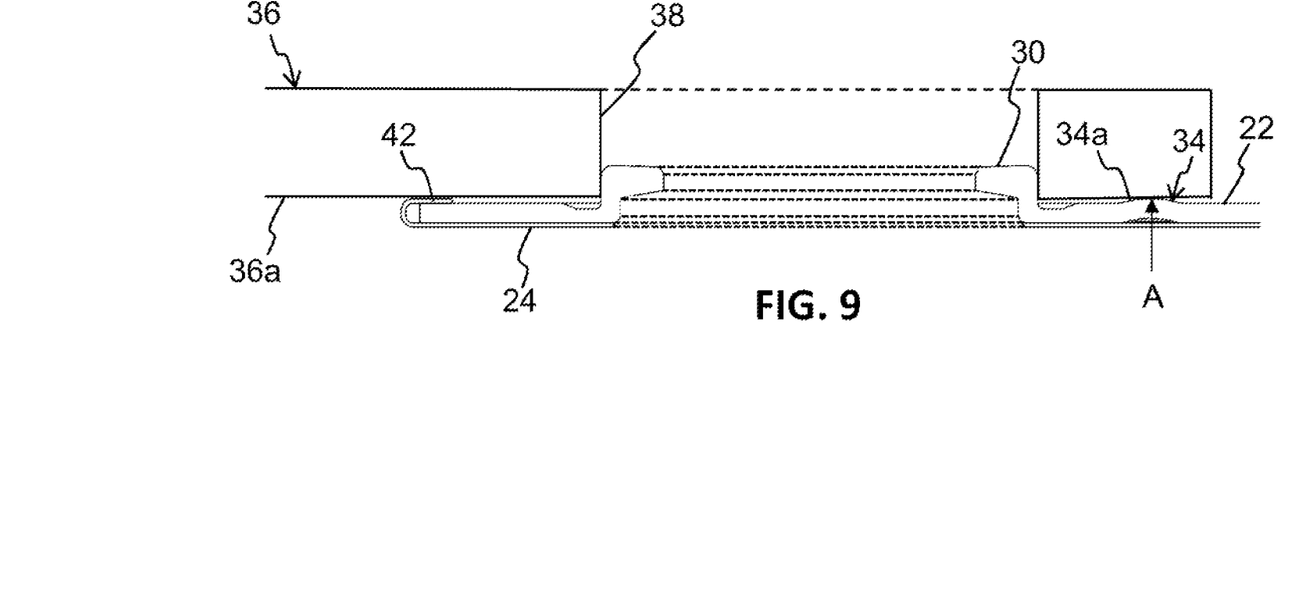
FIG. 9 is a side cross-sectional view of the baseplate, the load beam and the actuator arm according to an example of the present disclosure.

FIGS. 8-9 illustrate another alternate example, where the load beam 24 extends beyond the hinge 28 and under baseplate 22, and terminates in first and second U-shape features 42 that wrap around the far edge of the baseplate 22. The first and second U-shape features 42 have portions that extend along the upper surface 22a of baseplate 22, whereby in combination with a dimple 34 (positioned on the other side of the cylindrical hub 30) provide a contact plane for the lower surface 36a of the actuator arm 36, as best shown in FIG. 9. Compared to the ridge feature 40 in FIGS. 6-7, having two U-shape features 42 helps to reduce the contact area with the contact arm 36 and can provide a more consistent contact.

Figure 10:
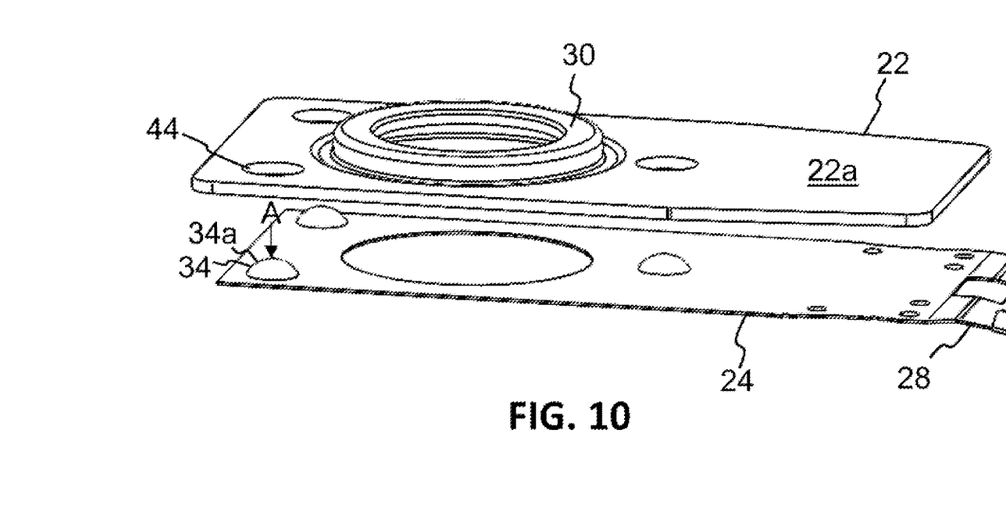
FIG. 10 is a perspective view of the baseplate and the load beam according to an example of the present disclosure.

FIG. 10 illustrates another alternate example, where the load beam 24 extends beyond the hinge 28 and under baseplate 22, and the dimples 34 are formed in the load beam 24 instead of in the baseplate 22. Specifically, the load beam 24 includes an upper surface 24a and a lower surface 24b that oppose each other, whereby dimples 34 protrude from the upper surface 24a of the load beam 24 in the same manner as described above with respect to the example where dimples 34 protrude from the upper surface 22a of baseplate 22. The dimples 34 of the load beam 24 extend through openings 44 in the baseplate 22, where the apexes of the rounded protruding sides 34a extend above the upper surface 22a of the baseplate 22 so as to engage with the lower surface 36a of actuator arm 36 during swaging. Since load beam 24 is thinner compared to the baseplate 22, the dimple forming operation can be relatively easier and may help to have a tighter tolerance control.

Figure 11:
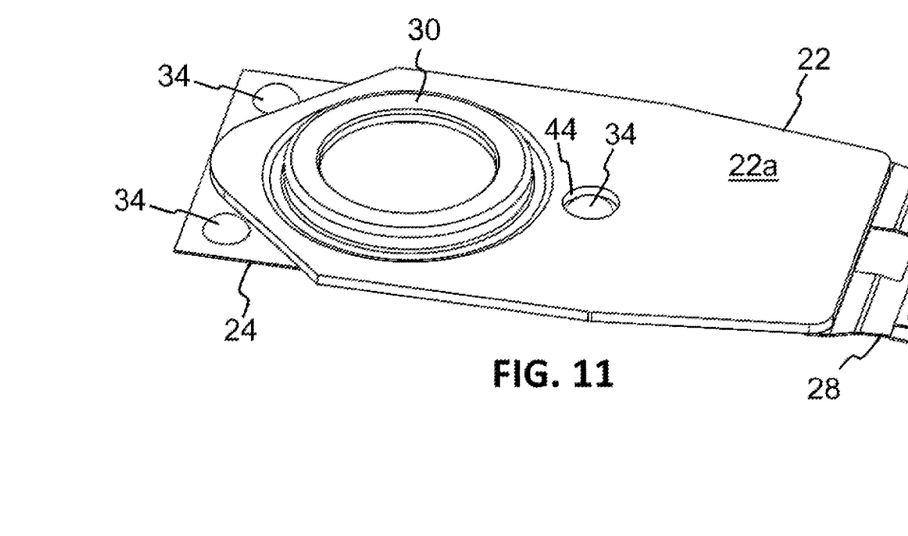
FIG. 11 is a perspective view of the baseplate and the load beam according to an example of the present disclosure.

FIG. 11 illustrates another alternate example, which is the same configuration as that in FIG. 10, except that two of the dimples 34 in the load beam 24 are positioned beyond the far edge of the baseplate 22. In this configuration, one of the dimples 34 extends through the opening 44 in the baseplate 22, while the other two dimples 34 extend up beyond the far edge of the baseplate 22. The smaller baseplate 22 of FIG. 11 can be advantageous to reduce the overall suspension mass.

Figure 12:
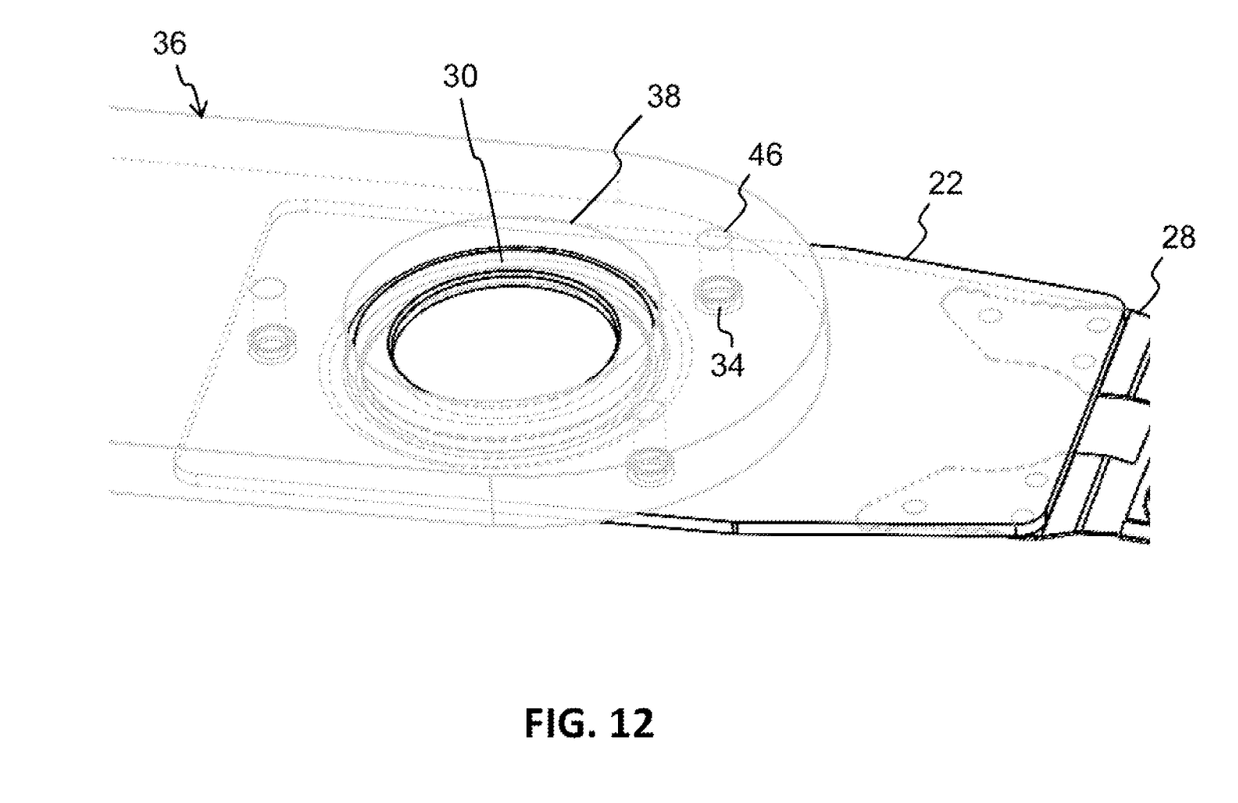
FIG. 12 is a perspective view of the baseplate, the load beam and the actuator arm according to an example of the present disclosure.

FIG. 12 illustrates another alternate example, which is the same configuration as that in FIGS. 3-5, except that the actuator arm 36 includes through-holes 46 aligned with dimples 34 such that the through-holes 46 at least partially receive the dimples 36 when the cylindrical hub 30 is inserted into the opening 38 of the actuator arm 36 (i.e., the apexes A of the dimples 34 are disposed in the through-holes 46). The through-hole feature 46 can provide an additional alignment feature during the swaging process.

It is to be understood that the present disclosure is not limited to the example(s) described above and illustrated herein, but encompasses any and all variations falling within the scope of any claims. For example, references to the present invention, embodiments or examples herein are not intended to limit the scope of any claim or claim term, but instead merely make reference to one or more features that may be covered by one or more of the claims.

What is claimed is:

1. A suspension assembly, comprising:
    a baseplate having an upper surface and a lower surface opposite the upper surface;
    a load beam mounted to the baseplate;
    a cylindrical hub extending from the upper surface, wherein the cylindrical hub comprises an inner surface that defines a swage hole extending through the baseplate;
    a plurality of dimples protruding from the upper surface of the baseplate, the plurality of dimples comprising two dimples disposed on a first side of the cylindrical hub disposed between the cylindrical hub and the load beam, with each of the two dimples being disposed offset of a central axis of the baseplate, and a third dimple disposed on a second side of the cylindrical hub and on the central axis of the baseplate, the second side opposing the first side, wherein each of the dimples includes a rounded side protruding from the upper surface of the baseplate and terminating in an apex; and
    an actuator arm having an opening, wherein the cylindrical hub extends into the opening such that an outer surface of the cylindrical hub is engaged with an inner surface of the opening, wherein a first end of the actuator arm comprises a curvature that corresponds with a curvature of the opening, and wherein the apexes of the dimples provide a contact plane above the upper surface of the baseplate for engaging with a lower surface of the actuator arm swaged to the baseplate.

2. The suspension assembly of claim 1, wherein each of the dimples includes a rounded side recessed into the lower surface of the baseplate.

* * * * *